United States Patent [19]

Neu

[11] 4,335,410
[45] Jun. 15, 1982

[54] THIN FILM MAGNETIC TRANSDUCER

[75] Inventor: William F. Neu, Oklahoma City, Okla.

[73] Assignee: Magnex Corporation, San Jose, Calif.

[21] Appl. No.: 137,137

[22] Filed: Apr. 4, 1980

Related U.S. Application Data

[62] Division of Ser. No. 3,380, Jan. 15, 1979, Pat. No. 4,260,450.

[51] Int. Cl.³ .............................................. G11B 5/20
[52] U.S. Cl. ..................................... 360/123; 360/126
[58] Field of Search ................. 360/123, 126, 127; 346/74.5; 29/603, 605; 156/656, 661.1; 427/89

[56] References Cited

U.S. PATENT DOCUMENTS

| | | | |
|---|---|---|---|
| 3,685,144 | 8/1972 | Trimble | 360/123 |
| 3,723,665 | 3/1973 | Lazzari et al. | 360/123 |
| 3,891,995 | 6/1975 | Hanazono et al. | 360/123 |
| 4,052,749 | 10/1977 | Nomura et al. | 360/127 |
| 4,149,205 | 4/1979 | Berghof et al. | 360/126 |

Primary Examiner—Stuart N. Hecker
Attorney, Agent, or Firm—Robert M. Hessin

[57] ABSTRACT

A method for formation of thin film inductive magnetic transducers wherein a minimum number of basic photomasks are utilized for deposition of successive thin film winding layers, and wherein all odd-to-even inter-film electrical contact points are disposed in a first transverse alignment through the transducer, and all even-to-odd inter-film contacts are aligned in a second transverse alignment through the transducer that is closely adjacent the first transverse alignment.

5 Claims, 11 Drawing Figures

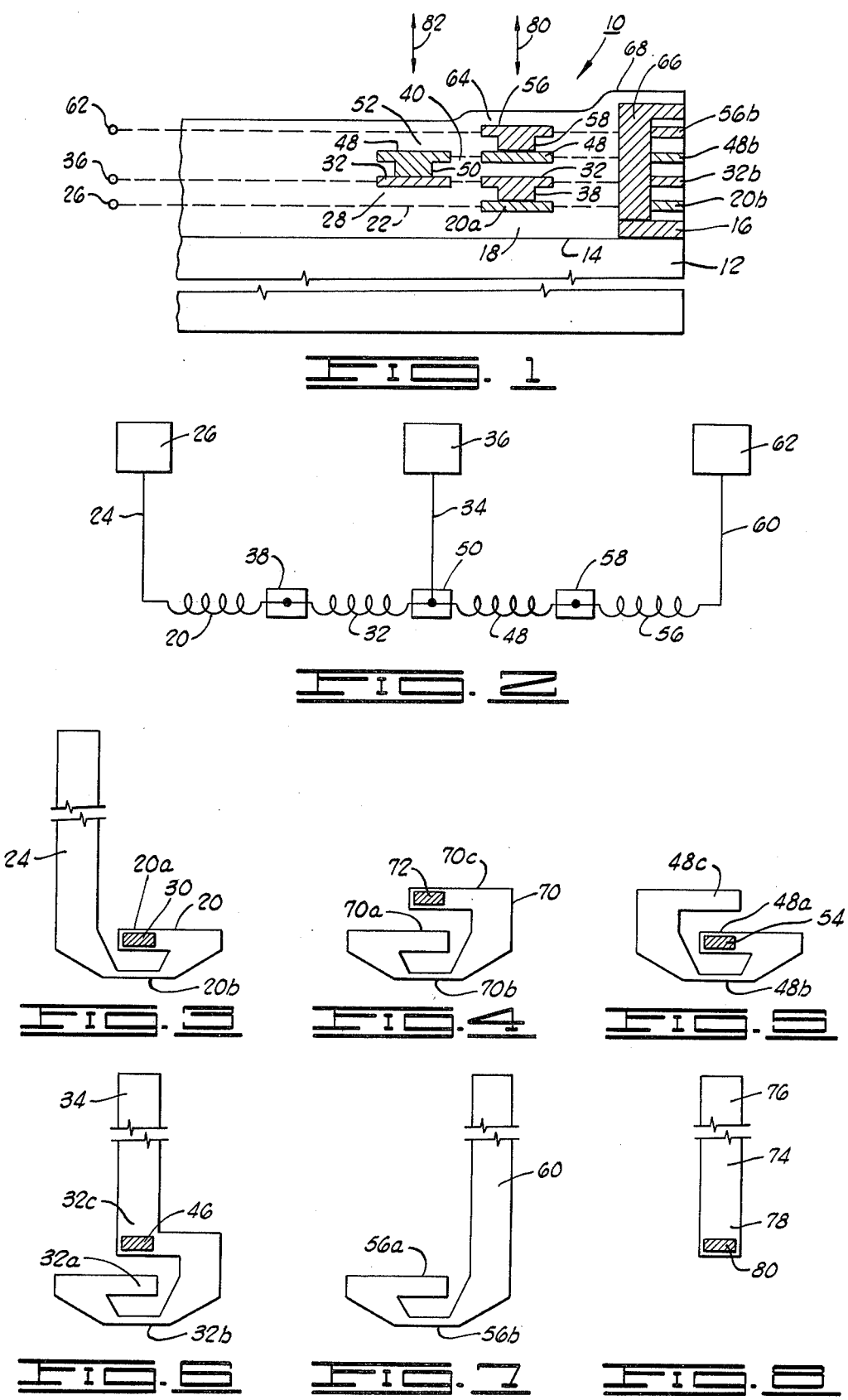

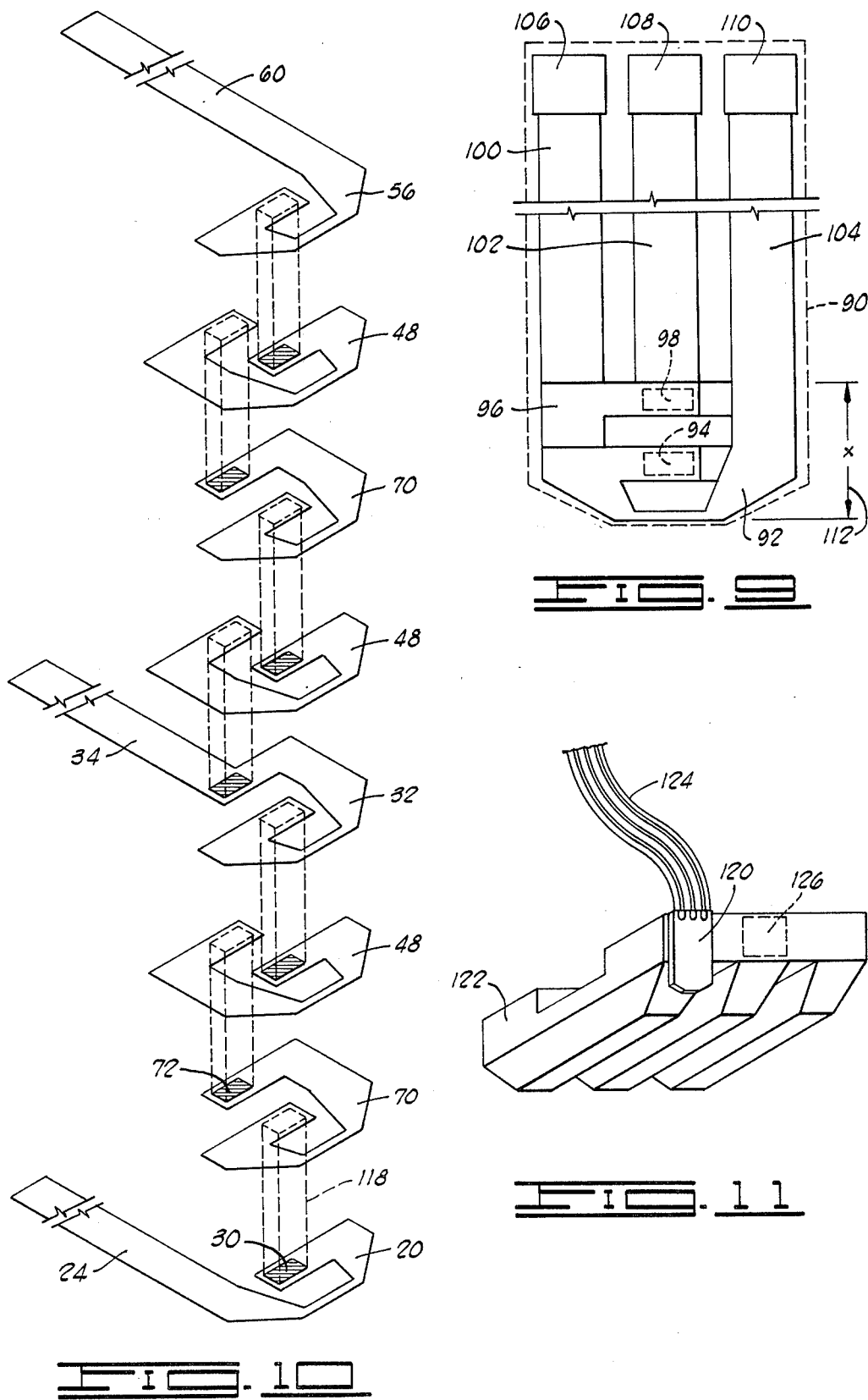

THIN FILM MAGNETIC TRANSDUCER

This is a division, of application Ser. No. 3,380, filed Jan. 15, 1979, now issued as U.S. Pat. No. 4,260,450 as issued on Apr. 7, 1981.

BACKGROUND OF THE INVENTION

1. Field of the Invention

The invention relates generally to thin film magnetic transducers and, more particularly, but not by way of limitation, it relates to an improved method of fabricating thin film transducers wherein winding resistance is maintained more uniform throughout the transducer winding interconnection.

2. Description of the Prior Art

Prior magnetic transducers of the thin film type are of course well known and the technology has utilized thin film deposition of multi-layer winding elements for a considerable time. However, in prior approaches to interconnection of adjacent thin film winding elements, such interconnection points have heretofore been progressively displaced relative to the coil throat such that extreme resistive non-linearity would necessarily result. That is, during the formation of the transducer as successive thin film winding elements are deposited onto a suitable substrate in stacked manner, the point of plating through for interconnection between adjacent winding elements was successively displaced to a different, further removed location for each individual winding element interconnection. In addition to the winding resistance non-linearity, the prior method required a separate photomask for the deposition of each one of the multiple of successive thin film winding layers.

SUMMARY OF THE INVENTION

The present invention contemplates a method for formation of thin film inductive magnetic transducers wherein a minimum number of basic photomasks are utilized for deposition of successive thin film winding layers, and wherein all odd-to-even inter-film electrical contact points are disposed in a first transverse alignment through the transducer, and all even-to-odd inter-film contacts are aligned in a second transverse alignment through the transducer that is closely adjacent the first transverse alignment.

Therefore, it is an object of the present invention to provide a method of forming thin film inductive transducers having more uniform individual winding resistances.

It is also an object of the present invention to provide a method for fabricating thin film magnetic transducers with greater speed and economy.

It is also an object of the present invention to provide a design for a multi-turn inductive magnetic recording transducer which has more flexibility as regards increasing the number of turns or individual thin film windings.

It is still further an object of the present invention to provide a method of forming thin film magnetic transducers wherein individual windings are maintained at lower resistance and shorter signal paths.

Finally, it is an object of this invention to provide a fabrication method for thin film inductive transducers wherein a lesser number of photomasks are required in constructing a multi-turn inductive transducer.

Other objects and advantages of the invention will be evident from the following detailed description when read in conjunction with the accompanying drawings which illustrate the invention.

BRIEF DESCRIPTION OF THE DRAWINGS

FIG. 1 is an idealized sectional view of a multi-turn inductive transducer constructed in accordance with the present invention.

FIG. 2 is a schematic illustration of the electrical character of the FIG. 1 transducer;

FIG. 3 illustrates a turn one deposition pattern;

FIG. 4 illustrates an even turn deposition pattern;

FIG. 5 illustrates an odd turn deposition pattern;

FIG. 6 illustrates an even turn center tap deposition pattern;

FIG. 7 illustrates a final turn deposition pattern;

FIG. 8 illustrates an odd turn center tap deposition pattern;

FIG. 9 is a plan view to illustrate, with insulation layers removed, the deposited thin film winding layers of a completed multiturn inductive transducer with center tap;

FIG. 10 illustrates in exploded perspective view the plurality of thin film winding layers in an eight turn inductive transducer with center tap; and FIG. 11 is a perspective view of a magnetic transducer as constructed in accordance with the present invention when mounted on a flyer assembly.

DETAILED DESCRIPTION OF THE INVENTION

FIG. 1 illustrates in central, vertical section a thin film magnetic transducer 10 as deposited on a substrate 12. Substrate 12 may be any of several suitable materials such as ferrite, silicon, etc., and it will vary in thickness in accordance with the end use of the transducer. For example, in one form of construction the thickness will be on the order of 20 mils and a large plurality of individual transducers 10 may be simultaneously deposited on a substrate wafer of requisite thickness for subsequent dicing of the individual transducers with final grinding and polishing to follow.

Deposition of transducer 10 takes place in conventional manner with successive deposition, patterning and etching of the various thin film layers progressing upward from the deposition surface 14 of substrate 12. While evaporation deposition techniques may be utilized, it has been found that better materials control will result from sputtering deposition. Such sputtering techniques may be carried out in depositing the various thin film layers by utilizing a sputtering machine as is commercially available from Materials Research Corporation of Orangeburg, N.Y.

For illustration purposes, the transducer 10 of FIG. 1 is a four turn transducer with center tap. First, there is deposited a bottom pole 16 as finally defined by a selected photomask patterning and etching in well-known manner. The bottom pole 16 may be formed by deposition of a suitable magnetically permeable material such as nickel-iron to prescribed thickness, e.g., 2 microns. Next there is deposited an insulation layer 18, e.g., silicon dioxide ($SiO_2$) to a thickness of $\frac{1}{2}$ micron. Following that, there is deposited the first winding thin film 20 consisting of the deposition of Nichrome (nickel-chromium) which provides a bonding surface for a subsequent deposition of gold. The Nichrome film may be deposited in a thickness on the order of 200 Angstrom with an overlay of gold film of about $\frac{1}{2}$ micron thickness. After deposition of the thin film 20, the film is patterned by photomask and etched to a plan view formation as shown in FIG. 3. Thus, and as indicated by dashed-line 22 (FIG. 1), the film 20 is electrically continuous and extends from a contact area 20a around through a throat portion 20b to a contact strip 24. As will be further described below, the contact strip 24 will eventually be connected to an external contact pad 26 (FIG. 1).

There then follows another deposition of insulation layer (SiO$_2$) 28 with subsequent patterning and etching of a contact window 30 (See FIG. 3) that allows plate-through contact with the next subsequent winding film. Thus, there is deposited, patterned and etched a nickel-chromium overlaid by gold film 32 which forms the second inductive winding or even turn. In this case, thin film 32 is a center tap formation and formed in accordance with the pattern of FIG. 6 to define a lower contact portion 32a, a throat portion 32b, and an upper contact portion 32c extending into a center tap contact 34 for eventual connection to a contact pad 36 (FIG. 1), as will be further described. Deposition of thin film 32 also results in a plate-through contact 38 to first winding film 20a as enabled by etched window 30 (FIG. 3).

After final deposition of procedures relative to thin film 32, there is then deposited another insulative (SiO$_2$) layer 40, which is further etched to expose a contact window 46 (FIG. 6). The next thin film pattern is then applied as an odd turn pattern such as that shown in FIG. 5. Thus, in referring again to FIG. 1, there is deposited a thin film 48 of Nichrome overlaid with gold that includes a plate-through contact 50 formed through contact window 46 (FIG. 6) into electrical communication with thin film 32. As shown in FIG. 5, the standard odd turn thin film conductor pattern 48 includes a lower contact portion 48a extending around through a throat portion 48b to terminate in an upper contact arm 48c, and there is then deposited yet another insulation (SiO$_2$) layer 52 that is further etched to expose a contact window 54 (FIG. 5).

There then follows a deposition, patterning and etching of a final turn 56 deposited in accordance with the pattern of FIG. 7 and providing plate-through contact 58 (FIG. 1). As shown in FIG. 7, the final turn Nichrome/gold thin film consists of a lower contact arm 56a extending through a winding throat portion 56b and terminating in a contact arm 60 which will then accommodate an external contact pad 62 (FIG. 1) in final finishing. After completion of formation of the thin film 56, yet another insulation (SiO$_2$) film 64 is deposited with subsequent etching to enable final deposition of a remaining pole piece 66 (nickel-iron). After deposition, patterning and etching of the upper pole 66, yet another outer insulation layer 68 is deposited for passivation in well-known manner. The insulation layer covering the outer ends of contact arms 24, 34 and 60 are then etched for final deposition of contact pads 26, 36 and 62, respectively, thereby to enable accessible external connection.

FIG. 2 illustrates the transducer 10 of FIG. 1 in electrical terms. Thus, the first thin film winding 20 is connected to thin film arm 24 and external contact pad 26 with interconnection via plate-through contact 38 to second thin film winding 32 which, in turn, connects via plate-through 50 to the third thin film winding 48 as well as via contact arm 34 to the contact pad 36, the center tap connection. The thin film winding 48 then finds further interconnection at plate-through contact 58 to the final turn thin film 56 and thin film arm 60 connected to the external contact pad 62.

The FIGS. 1 and 2 structure relate to a four-turn inductive transducer, in which case the center tap winding 32 takes the form of an even turn film structure as shown in FIG. 6. However, this structure is only used for center taps with coils of four turns, eight turns, twelve turns, etc. In the case of the alternative specifications such as six turns, ten turns, etc. series, an even turn thin film pattern 70 is used, such pattern being shown in FIG. 4. Thus, thin film pattern 70 includes a lower contact portion 70a, which will serve the plate-through function, as well as a throat portion 70b and terminating upper contact portion 70c which would then be further etched to expose a contact window 72. In the event of inductive transducers having six turns, ten turns, etc., even numbers of windings, a center tap connection would take the form of that shown in FIG. 8 which is merely a linear thin film deposition 74 extending contact arm 76 from a lower contact area 78 having a contact window 80 etched for exposure through the overlying insulative layer for subsequent connection to a lower arm 70a of an even turn pattern (FIG. 4).

Referring again to FIG. 1, no matter how many the selected number of thin film turns or windings, there can be but two alignments for interwinding connection; that is, all odd and even plate-through connections will be along a transverse axis indicated by arrow 80 and all even to odd winding interconnections will be along a transverse axis indicated by arrow 82 that is closely disposed adjacent axis 80. A skeletonized view of such thin film layer and their respective interconnections is shown in the top plan view of FIG. 9. This view illustrates a finished transducer 90 in outline with insulation and pole structure removed. There is exposed a final turn thin film 92 which terminates over a plate-through lower contact area 94, shown in dashed lines. A next lower thin film 96, an odd turn pattern as shown in FIG. 5, is then disposed for contact at respective lower and upper plate-through positions 94 and 98, the lower and upper interconnection alignments utilized by all of the individual thin films throughout the extent of the transducer thickness. A lower or first turn film contact arm 100, center tap contact arm 102 and final turn contact arm 104 are formed to extend rearward of the transducer whereupon they are etched for receiving the Nichrome/gold depositions thereby to be etched for formation of respective contact pads 106, 108 and 110.

It is a primary aim that the winding portion of the individual thin films be kept as short as possible, and it can be seen from the FIG. 9 illustration that the X dimension, arrow 112, can be maintained as small as possible in order to achieve the best result for low resistance and shorter signal path within the thin film structure. Using the present design approach, this X dimension will remain the same regardless of how many individual thin film turns or windings are included in the overall transducer structure. In the prior technique, it was necessary for the X dimension to increase with the addition of each thin film winding since the plate-through connections could not be maintained in direct overlay, i.e., transverse alignment through the chip, but were necessarily staggered upward relative to the FIG. 9 illustration.

FIG. 10 illustrates the thin film deposition stacking for an 8 turn inductive transducer having center tap, and it can be noted that all odd to even interconnections fall in alignment along a lower contact position while all even to odd interconnections fall in alignment along an upper contact area that is closely adjacent thereto. Adhering to the numeral designators of FIGS. 3 through 8, a first turn film 20 extends a contact arm 24 and is then etched to expose the lower contact window 30 through the overlying insulating layer. The next thin film layer is an even turn pattern (FIG. 4) which overlays a film 70 with plate-through contact (along dashed line 118) and there is then a subsequent insulation etching to expose contact window 72. The similar interconnective disposition is achieved up through the stack of thin film layers consisting of a next odd turn film 48, an even turn center tap thin film 32, another odd turn thin film 48, an even turn thin film 70, yet another odd turn thin film 48, and a final turn thin film 56 extending a contact arm 60. Thus, it can be seen that all plate-through contacts downward from an even to an odd thin film take place along the lower contact alignment 80 (FIG. 1), while all plate-through contacts downward from an odd to an even thin film take place along a juxtaposed upper contact alignment 82 (FIG. 1).

FIG. 11 illustrates a finished form of thin film magnetic transducer 120 as it might be disposed on a high speed recordation flyer assembly 122 of known type. Use of such flyer 122 in high speed recording practice is well-known as are the various aerodynamically advantageous shapes and formations. A three conductor ribbon connector 124 may be utilized for connection to the contact pads of transducer 120 as it may be carried from the flyer 122 while enabling both read and write capabilities. This capability further enables elimination of centeraligned support structure that was formerly required at flyer position 126 in certain read/write operations. In some applications, it may only be necessary to utilize a read only transducer in which case the center tap thin film need not be included; however, inclusion of the center tap serves to enable both positive and negative readout during write operations. The present thin film stacking technique is also usable with certain forms of magnetoresistive transducer wherein the write portion of that head will utilize the thin film stacking alignment as taught herein.

The foregoing discloses a novel thin film magnetic transducer structure and a unique method of formation that is fully compatible with the present manufacturing practices. In addition, use of the present method results in a reduction of the necessary photomasks that are necessary in that a preset minimum number of photomasks may be utilized for thin film stacking to any required number of windings while prior practices required a new photomask for each successive turn added to the stack. The attendant reduction in cost for fabrication of transducers utilizing the present method is yet another added advantage and one of considerable consequence.

Changes may be made in the combination and arrangement of steps as heretofore set forth in the specification and shown in the drawings; it being understood that changes may be made in the embodiments disclosed without departing from the spirit and scope of the invention as defined in the following claims.

What is claimed is:

1. A thin film magnetic transducer, comprising:
    a first conductive thin film having a configuration defining a lead portion, a throat portion, and a contact area portion terminating at a first position relative to the plane of the thin film;
    at least one even layer conductive thin film having a configuration beginning at said first position and extending to overlay a part of said lead portion, said throat portion, and terminating at a second position relative to the plain of the thin film that is adjacent said first position;
    at least one odd layer conductive thin film having a configuration beginning at said second position and extending to overlay a part of said lead portion, said throat portion, and terminating at said first position in superposition to the contact area of said first conductive thin film;
    a last conductive thin film having a configuration beginning at said first position and extending to overlay a part of said lead portion, said throat portion, and terminating in a second lead portion;
    insulative thin film means disposed between all of said conductive thin films;
    means providing conductive contact between the first position of all odd layer conductive thin films and the similar position of the overlaid even layer conductive thin film; and
    means providing conductive contact between the second position of all even layer conductive thin films and the similar position of the overlaid odd layer conductive thin film.

2. A magnetic transducer as set forth in claim 1 which further comprises:
    pole means insulatively disposed adjacent the throat portion of said conductive thin films.

3. A magnetic transducer as set forth in claim 1 which further includes:
    a center tap conductive thin film interposed for connection to the transducer inductive center and extending a center tap lead portion.

4. A magnetic transducer as set forth in claim 3 wherein said center tap conductive thin film comprises:
    an even layer conductive thin film configuration that extends from said first position to overlay said throat portion and second position, and extending to terminate in a center tap lead portion.

5. A magnetic transducer as set forth in claim 3 wherein said center tap conductive thin film comprises:
    a linear thin film configuration extending from said second position to terminate in a center tap lead portion.

* * * * *